C. P. NEATS.
CARBURETER.
APPLICATION FILED JUNE 16, 1916.
1,237,943.
Patented Aug. 21, 1917.
2 SHEETS—SHEET 1.
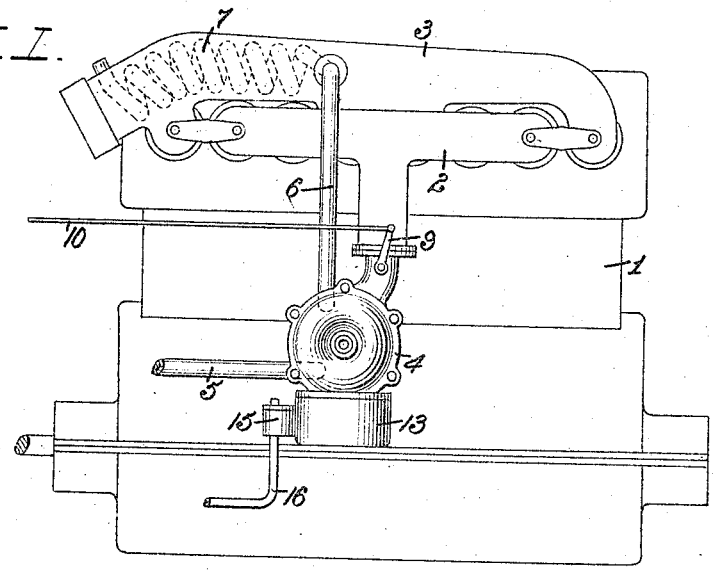
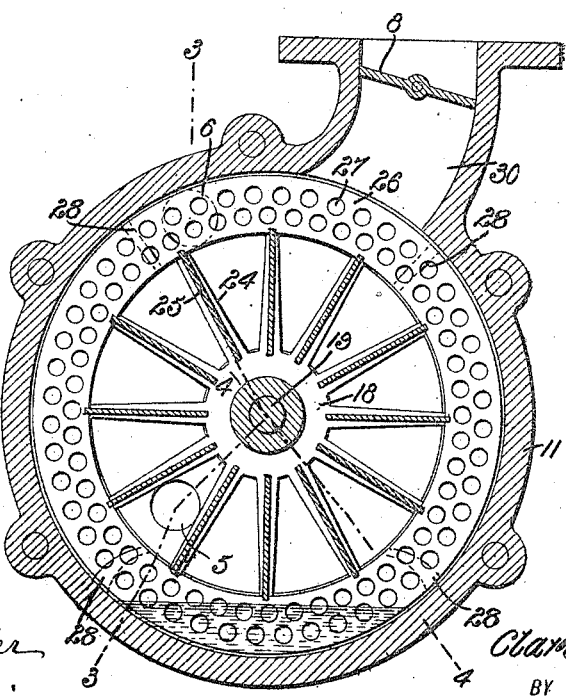
WITNESSES
H. T. Walker
A. L. Kitchin
INVENTOR
Clarence P. Neats
BY
ATTORNEYS C. P. NEATS.
CARBURETER.
APPLICATION FILED JUNE 16, 1916.
1,237,943.
Patented Aug. 21, 1917.
2 SHEETS—SHEET 2.
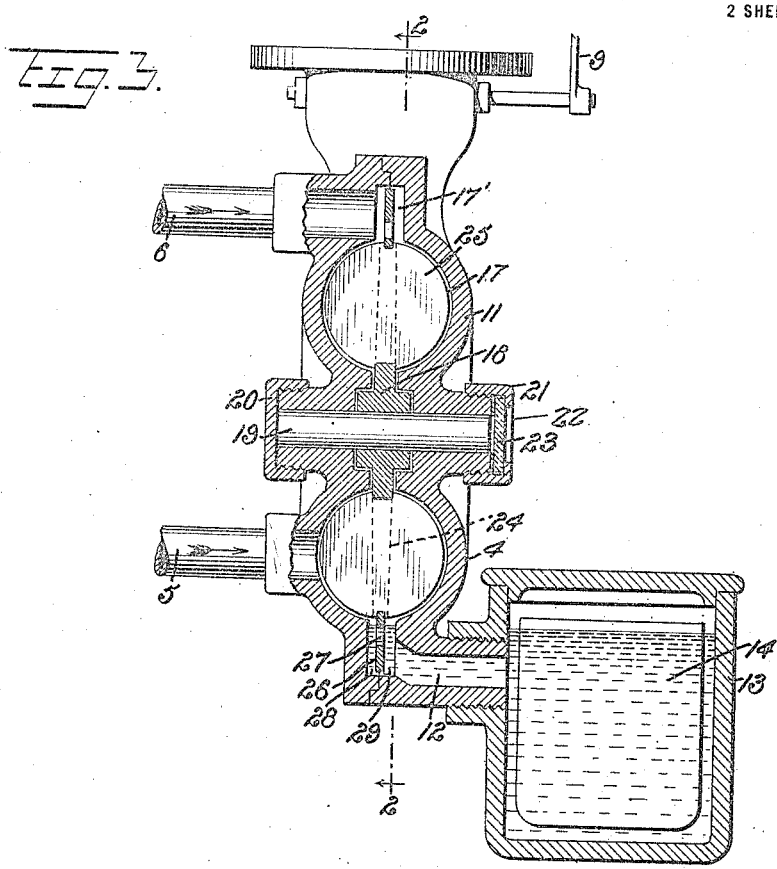
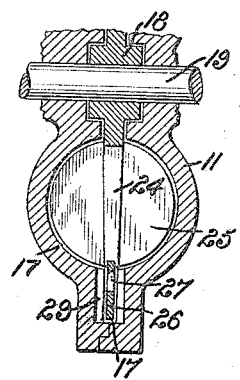
WITNESSES
H. T. Walker
A. L. Kitchin
INVENTOR
Clarence P. Neats
BY
ATTORNEYS

UNITED STATES PATENT OFFICE.

CLARENCE P. NEATS, OF EAST ORANGE, NEW JERSEY.

CARBURETER.

1,237,943.  Specification of Letters Patent.  Patented Aug. 21, 1917.

Application filed June 16, 1916. Serial No. 103,969.

*To all whom it may concern:*

Be it known that I, CLARENCE P. NEATS, a citizen of the United States, and a resident of East Orange, in the county of Essex and State of New Jersey, have invented a new and Improved Carbureter, of which the following is a full, clear, and exact description.

This invention relates to carbureters and has for an object the provision of an improved arrangement which will supply fuel in proportion to the speed of the engine to which it is connected.

Another object in view is to provide an improved arrangement whereby the fuel is taken up in small quantities and then mixed with the air while more or less finely divided before passing into the cylinder of the engine.

A still further object of the invention is to provide a carbureter in which is maintained a certain level of oil and a rotatable member operated by the suction of the engine for dividing the oil into fine particles and then mixing the same with air previous to the discharge of the oil.

A further object is to provide a carbureter with a rotating wheel structure having a perforated disk arranged on the periphery and blades arranged in a transverse plane together with means for maintaining the supply of oil through which said disk passes in order that the disk may supply small and more or less finely divided quantities of oil, the suction of the engine acting on said blades for rotating the wheel structure in proportion to the speed of the engine.

In the accompanying drawings,

Figure 1 is a side view of an engine disclosing a carbureter embodying the invention applied thereto.

Fig. 2 is a longitudinal vertical section through Fig. 3 on line 2—2.

Fig. 3 is a sectional view through Fig. 2 on line 3—3.

Fig. 4 is a fragmentary sectional view through Fig. 2 on line 4—4.

Referring to the accompanying drawings by numerals, 1 indicates an engine of any desired kind which is provided with the usual intake manifold 2 and the usual exhaust manifold 3; connected with the intake manifold 2 is a carbureter 4 embodying the invention, the said carbureter being supplied with cold or atmospheric air through pipe 5 and heated air through pipe 6, pipe 6 extending into exhaust manifold 3 and forming a heating coil 7 therein. The carbureter 4 is provided with the usual butterfly valve 8 operated by the crank or arm 9 to which a controlling rod or cable 10 is connected whereby the carbureter may be throttled down at any time.

The carbureter 4 is provided with a casing 11 preferably formed in two parts and connected in any suitable manner, said casing having an inlet opening 12, which receives a supply of fuel, as for instance gasolene, kerosene or other similar fuel from a container 13 carrying a float 14, said float operating a suitable valve in the extension 15 of container 13 whereby the fuel entering through pipe 16 may be maintained at substantially the level shown in Fig. 3.

The casing 11 is formed with an annular chamber 17 which is circular in cross section and which merges into an annular chamber 17' preferably rectangular in cross section, as shown in Fig. 3. The chambers just described accommodate a wheel 18 supported by a shaft 19 in suitable bearings in the casing 11, said bearings having caps 20 and 21 for properly holding the shaft 19. The cap 21 is provided with an opening 22 said cap holding in place a glass or transparent disk 23 which prevents dust and dirt from entering into the bearing, but which allows any one to observe the shaft 19 at any time in order that the operator may see whether or not the wheel 18 is turning. It is of course evident that the wheel 18 is rigidly connected by a key or otherwise to the shaft 19 and rotates with said shaft. The wheel 18 is provided with a plurality of spokes 24 (Fig. 2) said spokes being bifurcated for receiving the blades or disks 25 which blades or disks are circular as shown in Fig. 3 and fit the chamber 16 without pinching. This construction arrangement is a special kind of air wheel or fan and is provided in order that the suction of air through pipes 5 and 6 may cause the wheel to rotate, especially the suction of air through pipe 5. Connected centrally of the wheel 18 and forming the periphery thereof is a flat ring 26, said ring being provided with a plurality of apertures 27. The ring 26 extends into the chamber 17', but does not fill said chamber. In order to prevent a circulation of oil in said chamber a plurality of fins or blades 28 and 29 are provided which extend from the walls of the casing and come almost in contact with ring 26. These fins will allow the oil carried in the aperture 27 to freely pass, but resist the passing of any additional oil or any air.

In operation when the engine to which the carbureter is connected is turned over the suction produced thereby will cause air to enter through pipe 5 into the lower part of the casing and pass from said lower part to the discharge throat or mixing chamber 30 and will cause the wheel 18 to rotate and as it rotates the lower part of the ring 29 will pass through the oil fed in the lower part of chamber 17' through the passageway 12. The oil in the various apertures 27 will pass the inlet opening of the pipe 6 and as the suction of the engine is drawing in air through this pipe, which air passes through the apertures 27, the same will mix with the oil in said apertures and carry the oil into the chamber 30 and will there mix with the air from pipe 5 so that a proper combustion mixture may be discharged into the manifold tube. As the air from pipe 6 is heated in coil 7 it will be observed that the first air striking the fuel will be warm or hot, as the case may be, and will thereby produce a better carburation of the finely divided parts of oil carried by ring 26 in apertures 27. This heated air and oil mixture is diluted by the cold air in chamber 30 and then fed into the manifold. As the ring 26 usually rotates at an appreciable speed only a small quantity will usually be carried up by the ring in the apertures 27 whereby the heated oil may quickly and readily mix therewith so as to produce almost perfect carburation in the case of gasolene and a very effective carburation in the case of kerosene or other comparatively heavy oils. As the engine moves faster and faster the suction will become greater and greater and consequently the wheel 18 will rotate faster and thereby bring more fuel opposite pipe 6 in a given time in order to supply fuel in proportion to the speed of the engine. It is evident that a spring or other form of air controlling valve may be inserted in the pipe 5 so as to regulate the auxiliary air to any desired extent in order to secure a proper mixture.

What I claim is:—

1. In a carbureter of the character described, a casing provided with a central chamber and an auxiliary chamber radiating therefrom, means for maintaining a predetermined quantity of oil in the lower part of said auxiliary chamber, a wheel arranged in said casing formed with blades fitting in said central chamber and with a disk fitting in said auxiliary chamber, said disk being formed with a plurality of openings whereby when said wheel is rotated small quantities of oil will be taken up in said openings, means for directing air into said chamber for engaging said blades for rotating said wheel when suction is produced in the discharge throat of the carbureter, a plurality of protecting blades arranged in said auxiliary chamber and extending to a position near said disk so as to limit the amount of oil taken up by the disk, means for directing an air blast against oil taken up by the disk for producing carburation thereby and means forming a mixture discharge throat.

2. In a carbureter of the character described, a casing, means for maintaining a level of oil in the bottom part of said casing, said casing being provided with an annular outer chamber and an annular inner chamber merging into the outer chamber, a wheel arranged in said casing provided with a plurality of spokes, a blade connected with each of said spokes, said blades being arranged in said inner chamber and extending transversely thereof so as to loosely fit the inner chamber, a ring connected to the outer end of said spokes and extending into the said outer chamber, said ring being provided with a plurality of comparatively small apertures, said ring being adapted to pass through said level of oil whereby small quantities of oil are taken up in said apertures, means for directing air into said inner chamber for engaging said blades for rotating said wheel when suction is produced in the discharge throat of the carbureter, and means for directing air against the upper part of said wheel for causing a carburation of the oil, said last-mentioned air passing to said throat and mixing with the air from said inner chamber.

CLARENCE P. NEATS.